J. F. DILLON.
SPLICING CLAMP FOR CABLES AND THE LIKE.
APPLICATION FILED OCT. 7, 1915.
1,236,551. Patented Aug. 14, 1917.
Fig. 1.
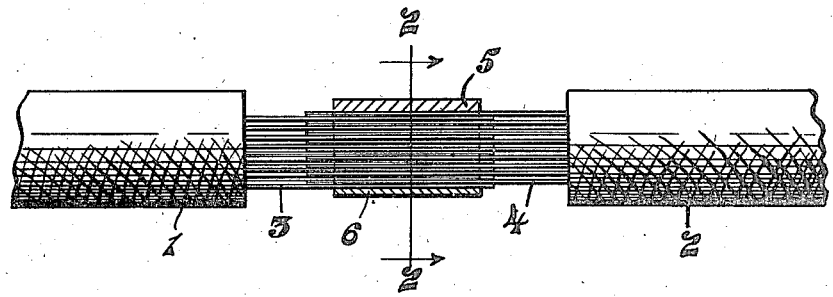
Fig. 3.
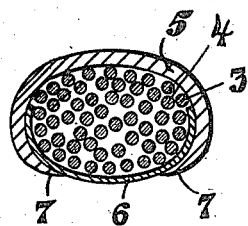
Fig. 2.
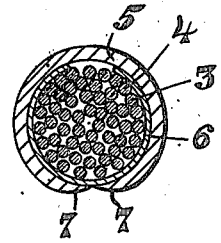
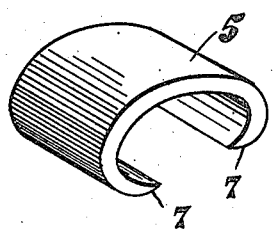
Fig. 5.
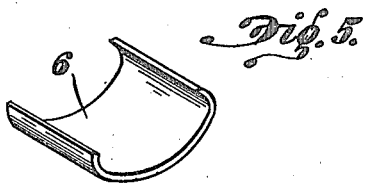
Fig. 4.
Witness
Robert O. Karcher.
Inventor
James F. Dillon.
By F. W. Byrd
Attorney

UNITED STATES PATENT OFFICE.

JAMES F. DILLON, OF CROWN CITY, OHIO, ASSIGNOR TO THE AMERICAN MINE DOOR COMPANY, OF CANTON, OHIO, A CORPORATION OF OHIO.

SPLICING-CLAMP FOR CABLES AND THE LIKE.

1,236,551.

Specification of Letters Patent.

Patented Aug. 14, 1917.

Application filed October 7, 1915. Serial No. 54,532.

*To all whom it may concern:*

Be it known that I, JAMES F. DILLON, a citizen of the United States, residing at Crown City, in the county of Gallia and State of Ohio, have invented a new and useful Splicing-Clamp for Cables and the like, of which the following is a specification.

The present invention relates to improvements in splicing clamps for cables and the like and has more especial reference to a clamp adapted to splice the adjoining ends of cables through which an electric current is passed.

The object of the present invention is to provide a clamp of the character referred to which may be readily attached to the adjoining ends of cables holding the same tightly together.

A further object is the provision of a splicing clamp which will assure positive contact between the opposing extremities of the cables desired to be spliced.

A further object is to provide a simple, inexpensive and efficient device of the character referred to.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings:

Figure 1 is a side elevation of two adjoining extremities of a cable showing my splicing clamp applied thereto, the clamp being shown in section.

Fig. 2 is a section on the line 2—2, Fig. 1.

Fig. 3 is a similar section before the clamp has been closed.

Fig. 4 is a detail perspective view of the clamping member.

Fig. 5 is a detail perspective view of the retaining member used in the clamp.

Similar numerals of reference indicate corresponding parts in all the figures of the drawing.

Referring more especially to the construction illustrated in the accompanying drawings, the numerals 1 and 2 indicate the usual insulation upon two adjoining cables and the numerals 3 and 4 indicate the strands or wire conductors carried within the cables, said strands being shown meshed or interlaced in Fig. 1.

The splicing clamp comprises the clamping member 5 composed of malleable iron or other similar material and the retaining member 6 composed of a thin sheet of copper or other suitable material bent in the forms shown in Figs. 3 and 5. The extremities of the clamping member are shown beveled as indicated at 7.

In assembling the parts for the purpose of splicing the extremities of two cables, the retaining member 6 is placed within the clamping member 5 in the position shown in Fig. 3, and is slid upon the extremity of the strands or conductor wires of one of the cables and the strands or wires of the other cable adapted to be adjoined thereto are then meshed or interlaced with the strands of the first mentioned cable and the clamping device moved in the position shown in Fig. 1. The clamping member is then forced into the position shown in Fig. 2 either by striking the same with a hammer or other tool or by the use of a vise or similar device. As the clamping member is forced into this position the strands of the two adjoining cables are forced tightly together and the extremities of the cables are thus firmly spliced together and form a continuous electrical conductor. For the purpose of insulation the splice may then be wrapped with tape or other suitable material in the usual manner. By forming the members 5 and 6 substantially segmental transverse to their curvature, and of bendable material the cables can be tightly clamped, regardless of the diameter of the cable. It is well understood that the diameters of cables vary to a considerable extent and by forming the clamping members so that they can slide laterally to their curvature with reference to each other, the joined ends of the cable can be securely clamped, owing to the fact that the diameter of the clamp can be varied to correspond with the diameter of the cable designed to be coupled.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A splicing clamp of the character described comprising an elliptical clamping member composed of relatively heavy malleable material provided with a cut-out portion and a curved retaining sheet of relatively light material located within said elliptical clamping member and bridging the cut-out portion thereof.

2. A splicing clamp of the character described comprising an elliptical clamping member composed of relatively heavy malleable material provided with a cut-out portion and a curved retaining sheet of relatively light material located within said elliptical clamping member and bridging the cut-out portion thereof, said elliptical clamping member arranged to be compressed into substantially circular cross section.

3. A splicing clamp of the character described comprising an elliptical clamping member composed of malleable material and provided with a cut-out portion, the parallel edges of said clamping member being tapered and a curved retaining sheet of relatively light material located within said clamping member and bridging said cut-out portion.

In testimony that I claim the above, I have hereunto subscribed my name.

JAMES F. DILLON.